(12) United States Patent
Schultz (10) Patent No.: US 9,952,327 B2
(45) Date of Patent: Apr. 24, 2018

(54) HOLE SELECTION SYSTEM AND METHOD (76) Inventor: Jonathan Dwight Schultz, Richardson, TX (US)

( * ) Notice: Subject to any disclaimer, the term of this patent is extended or adjusted under 35 U.S.C. 154(b) by 1192 days.

(21) Appl. No.: 12/760,817

(22) Filed: Apr. 15, 2010

(65) Prior Publication Data

US 2011/0258180 A1 Oct. 20, 2011

(51) Int. Cl.
| | | |
|---|---|---|
| G06F 7/00 | (2006.01) | |
| G06F 17/30 | (2006.01) | |
| G01S 19/19 | (2010.01) | |
| A63B 57/00 | (2015.01) | |
| A63B 69/36 | (2006.01) | |
| A63B 71/06 | (2006.01) | |

(52) U.S. Cl.
CPC ............ *G01S 19/19* (2013.01); *A63B 57/505* (2015.10); *G06F 17/30241* (2013.01); *A63B 69/36* (2013.01); *A63B 69/3691* (2013.01); *A63B 2071/0691* (2013.01); *A63B 2225/20* (2013.01); *A63B 2225/50* (2013.01); *G06F 17/30864* (2013.01)

(58) Field of Classification Search
USPC .......................................... 707/E17.044, 918
See application file for complete search history.

(56) References Cited

U.S. PATENT DOCUMENTS

| | | | | |
|---|---|---|---|---|
| 3,260,526 | A * | 7/1966 | Seitz .............................. | 273/245 |
| 5,265,875 | A * | 11/1993 | Fitzgerald ..................... | 473/169 |
| 5,865,689 | A * | 2/1999 | Heyman ........................ | 473/404 |
| 6,171,199 | B1 * | 1/2001 | Cohodas et al. .............. | 473/131 |
| 6,409,607 | B1 * | 6/2002 | Libit et al. .................... | 473/170 |
| 6,525,690 | B2 * | 2/2003 | Rudow et al. ............. | 342/357.4 |
| 6,582,328 | B2 * | 6/2003 | Kuta et al. ..................... | 473/405 |
| 2003/0149496 | A1 * | 8/2003 | Johnson .......................... | 700/91 |
| 2007/0016438 | A1 * | 1/2007 | Bain .................................. | 705/1 |
| 2007/0171394 | A1 * | 7/2007 | Steiner et al. ............... | 356/5.01 |
| 2007/0184910 | A1 * | 8/2007 | Aronchick ..................... | 473/169 |
| 2009/0082139 | A1 * | 3/2009 | Hart .............................. | 473/407 |
| 2009/0210263 | A1 * | 8/2009 | Smeenge et al. ................. | 705/5 |

FOREIGN PATENT DOCUMENTS

WO WO 2011/130037 A1 10/2011

OTHER PUBLICATIONS

Developmental Software Disclosure, with screenshots from the developmental version of the software, Jun. 2008, 5 pages.
PCT International Search Report dated Jun. 17, 2011 for PCT/US11/31091, 10 pages.

* cited by examiner

*Primary Examiner* — Tuan A Pham
*Assistant Examiner* — Muluemebet Gurmu
(74) *Attorney, Agent, or Firm* — Hitchcock Evert LLP (57) ABSTRACT

Embodiments of the present disclosure provide a system and method for hole selection in a defined area. Embodiments further disclose a system and method for selecting a golf hole location on a green. The system may include a storage component, a processing component, an analyzing component, a selecting component, and a user interface. The storage component may store a database of potential hole locations and attributes. The analyzing component may apply limitations to selecting golf hole locations based upon attributes of each golf hole location to determine an available set. The selecting component may select a golf hole location from the available set. The user interface may be used to input data and output a presentation of a selected golf hole location.

42 Claims, 3 Drawing Sheets

HOLE SELECTION SYSTEM AND METHOD

FIELD OF THE INVENTION

The invention generally relates to the field of systems and methods for selecting locations within a set area. This invention further relates to the field of systems and methods for selecting golf hole locations on a golf green. This invention also relates to the field of systems for designing golf hole placements on each green of a golf course.

BACKGROUND OF THE INVENTION

Golf green management involves the regular selection and planning of golf hole locations on the green. Golf hole locations for each green change on a regular basis, such as daily. The golf hole locations are changed for a number of reasons, including the maintenance of the green, creating an even distribution of golf hole locations on the green over time, and variability of the golf hole locations over time to increase a golfers likelihood to replay the golf course. Accordingly the proper selection of golf hole locations on a green is an important aspect of golf green management and maintenance.

Conventional methods for selecting golf hole locations on a golf green typically involve a greens superintendent dividing the green into sections and choosing a hole location within one section of the green. Each time the greens superintendent chooses to move the hole location, the greens superintendent selects a hole location in the next section of the green. The greens superintendent repeats this process rotating through the defined sections of the green. This process is followed to help vary the placement of the golf hole location in order to maintain the green by protecting it from excessive wear and tear in any single portion of the green. By rotating the position of the cup or golf hole location, foot traffic on the green is likely to change allowing areas of the green around prior hole locations to recover.

SUMMARY OF THE INVENTION

Over time conventional methods of selecting golf holes may lead to patterned and predictable golf hole locations for a number of reasons. For example, a greens superintendent may develop preferences for the hole locations within each section and choose to place the hole location at the preferred location each time that section is used, effectively limiting the variance of hole locations over time. If a golfer perceives the course to be patterned or predictable, the golfer may not seek to replay the course as often as desired. In addition, a pattern of use may lead to additional patterns of wear and tear to the green and impact future play or may complicate event planning.

Conventional systems and methods do not effectively assist the greens superintendent in effective management of the greens through variation in hole locations. Although some systems have been developed to assist a greens superintendent, none of the systems effectively assist a greens superintendent in selecting golf hole locations in a evenly distributed fashion or to effectively plan the varied hole selection over time. For example, U.S. Pat. No. 5,364,093 describes a global positioning satellite ("GPS") device used to identify the cup location when the hole is cut by a greens superintendent for use with another GPS device to determine the distance between the other GPS device and the golf cup. Although the GPS device may identify the precise location of a cup, it does not assist the greens superintendent in selecting where to cut the golf hole location and placement of the cup.

The present invention provides for a system and method of assisting a greens superintendent in the selection of a golf hole location on a green. It assists in selecting a golf hole location that is consistent with the goals of proper green management and providing variability in the golf hole locations over time.

Accordingly, an object of the present invention is to provide a system and method that assists a greens superintendent in managing a green.

Another object of the present invention is to provide a system and method that assists a greens superintendent in selecting a golf hole location on a green.

Another object of the present invention is to provide a system and method that assists a greens superintendent in maintaining a record of the historical use of golf hole locations on a green.

Another object of the present invention is to provide a system and method that assists a greens superintendent in scheduling the use of golf hole locations over time.

Another object of the present invention is to provide a system and method that assists a greens superintendent in scheduling golf hole locations for use at a selected future date.

Another object of the present invention is to provide a system and method that analyzes attributes of golf hole locations to determine an available set of golf hole locations from which to select a golf hole location.

Another object of the present invention is to provide a system and method that analyzes attributes of golf hole locations to determine an available set of golf hole locations from which to select a golf hole location based upon user inputs.

Another object of the present invention is to provide a system and method that assists a greens superintendent in selecting golf hole locations based upon course management considerations.

Another object of the present invention is to provide a system that automates the selection of golf hole locations.

Another object of the present invention is to provide a system that outputs a presentation of the golf hole location.

Another object of the present invention is to provide a system that outputs a presentation of the golf hole locations for each green of a golf course.

Another object of the present invention is to provide a system that outputs instructions for cutting a golf hole to a greens superintendent.

Additional aspects, advantages and features of the present invention are included in the following description of exemplary examples thereof, which description should be taken in conjunction with the accompanying figures, wherein like numerals are used to describe the same feature throughout the figures.

DETAILED DESCRIPTION

Figure 1:
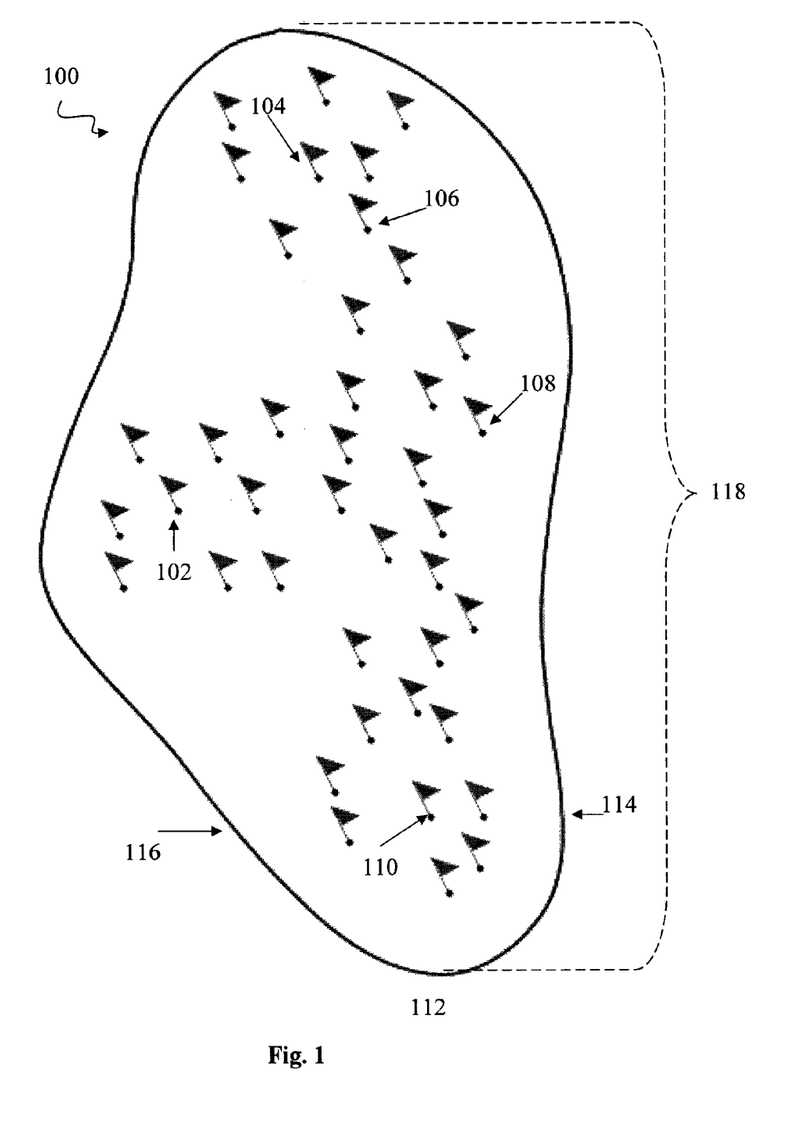
FIG. 1 is a depiction of a green with multiple golf hole locations illustrated.

The depiction of green 100 in FIG. 1 is provided as a reference to further illustrate descriptions provided herein, and will be referred to throughout this application. Golf hole locations 102, 104, 106, 108, and 110 are depicted within green 100. One of skill in the art will recognize that the size and shape of green 100 is for exemplary purposes only and the system and method described herein may be applied to any green or other defined area. In addition the identified golf hole locations are for exemplary purposes only, as one skilled in the art will recognize, a green may have any number of potential golf hole locations that may be considered by the system and method described herein.

Figure 2:
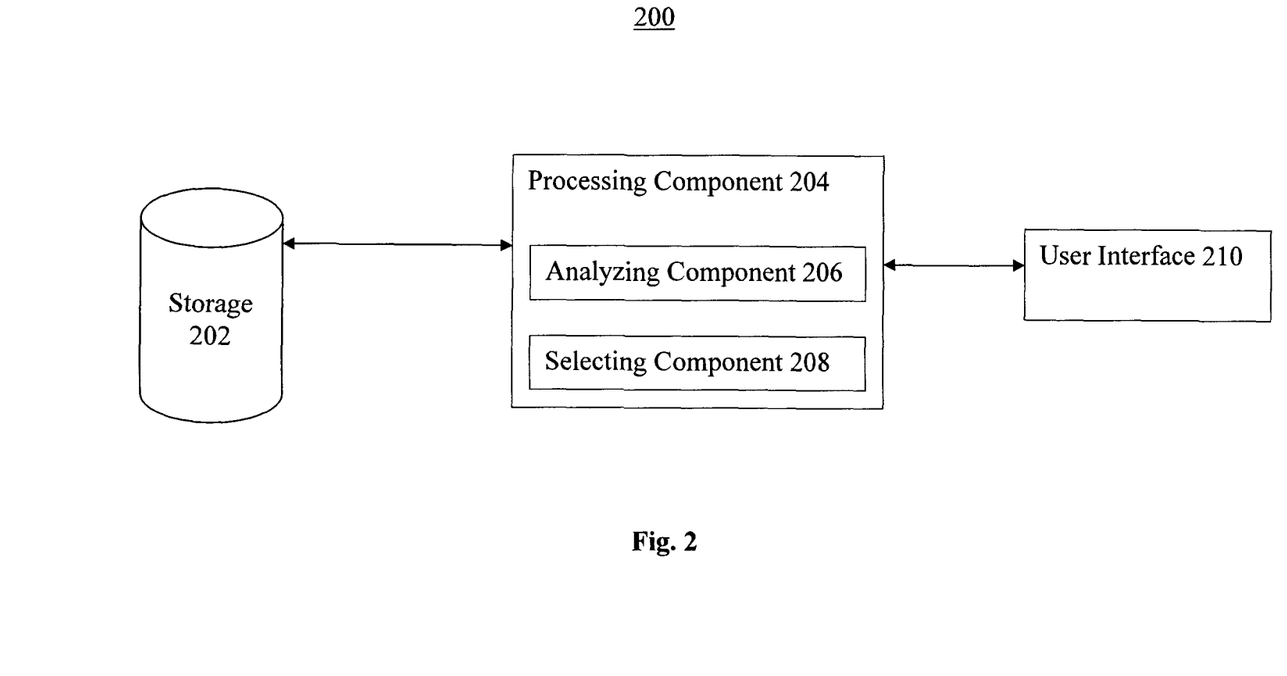
FIG. 2 is a diagram depicting a system embodiment of the present invention.

FIG. 2 depicts a block diagram of system 200 which reflects an embodiment of the system. Although system 200 is depicted as storage component 202, processing component 204 and user interface 210, system 200 may be configured in any number of manners and with a variety of components. Processing component 204 is depicted as having analyzing component 206 and selecting component 208, but may include additional components and/or alternative components.

Storage component 202 may be any structure designed for storing information including electronic storage such as memory. As one skilled in the art will recognize, storage component 202 may be used to store information in any storage format. For example, golf hole locations 102, 104, 106, 108 and 110 along with any number of attributes may be stored in a portion of storage component 202 associated with green 100. Storage component 202 may represent a database as it is described further below. Storage component 202 is associated with processing component 204. Storage component 202 may be associated with the processing component 204 within a single device, via a wired or wireless connection, or a combination of both.

In an embodiment, processing component 204 is a microprocessor, but processing component 204 may be any electrical or mechanical processing unit. In addition to analyzing component 206 and selecting component 208, processing component 204 should be capable of communicating with storage component 202 and user interface 210. Analyzing component 206 operates to determine an available set of potential golf hole locations and selecting component 208 operates to select one golf hole location from the available set of potential golf hole locations. The operation of processing component 204 along with analyzing component 206 and selecting component 208 is further illustrated by FIG. 3 and described below.

User interface 210 may be associated with processing component 204 within a single device, via a wired or wireless connection, or a combination of both. User interface 210 represents any components for inputting information by a user and/or outputting information to a user. User interface 210 may be a display, a mobile phone (such as a cellular phone or smart phone), another mobile electronic device (such as a GPS device or a portable computer), and/or an electronic communication interface (such as an internet connection, a wireless module, or a universal serial bus port) which may be used for the input and/or output of information. In addition, user interface 210 may represent an output only component, such as a printer or a speaker, or an input only component, such as a keyboard, a mouse or a microphone. One of skill in the art will recognize that user interface 210 may be any one or combination of input and/or output components. Additional description of embodiments of user interface 210 will be discussed below.

Figure 3:
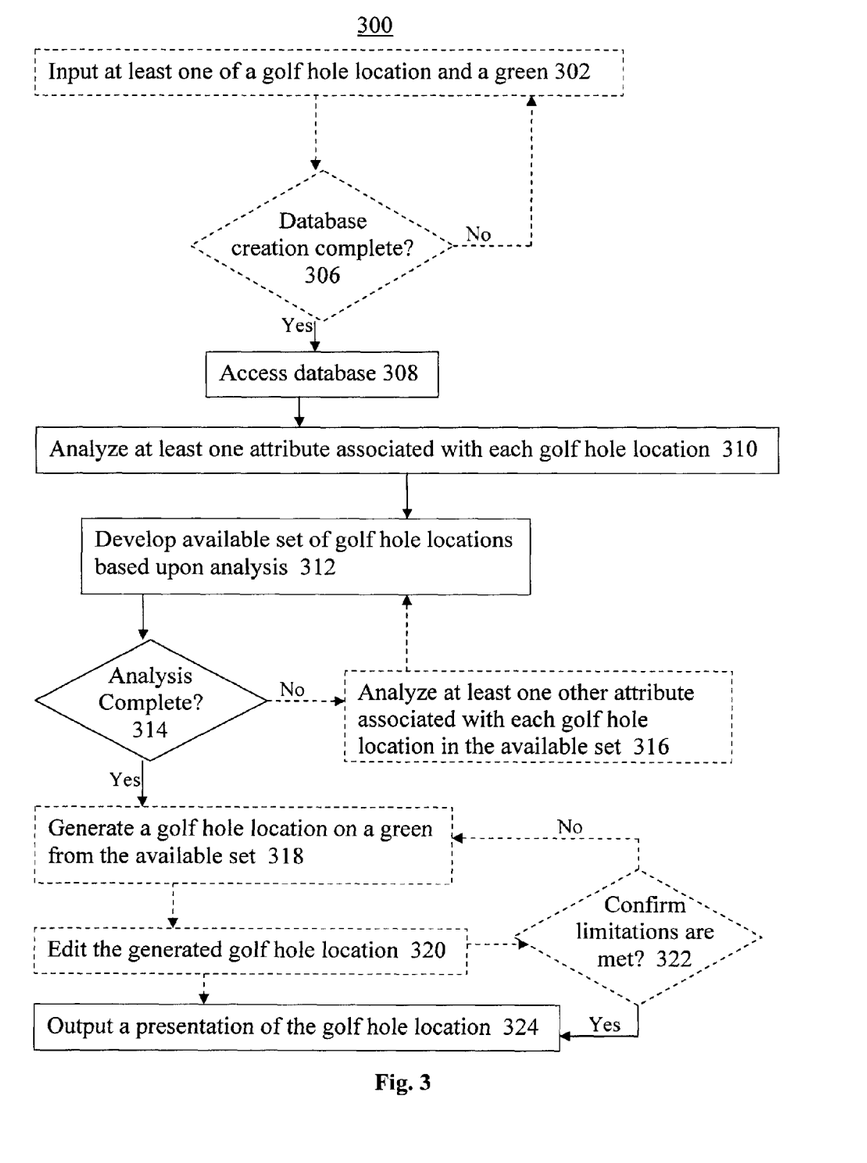
FIG. 3 is a flowchart depicting an embodiment of the present invention.

A flowchart of process 300 is depicted in FIG. 3. Process 300 illustrates one embodiment of the system and method. For illustrative purposes some aspects of shown in this embodiment are depicted as dotted lines, indicating their optional nature in this embodiment. As one skilled in the art will recognize, other portions of process 300 may be optional in other embodiments and remain within the scope and spirit of the invention.

In this embodiment, in box 302, a golf hole location is input into a database within storage component 202 and, in box 304, an associated green for the golf hole location is identified in the database. For example, golf hole location 102 may be input into storage component 202 and then green 100 may be identified as the associated green. One skilled in the art will recognize that the order of inputting golf hole locations and identifying a green may be varied. For example, in other embodiments, green 100 may be identified followed by golf hole location 102. As one skilled in the art will recognize, any number of methods or manners for identifying and storing a location may be utilized, including the use of a coordinate system, a relative location based system, or any other location based system. While it is not shown in process 300, other attributes of a golf hole location may be input into the database also.

The input and identification may be accomplished by any number methods, including user input through user interface 210, parsing a form, downloading an electronic collection of information, or any other manner of identifying and inputting the information in a database. For example, a user may load a table which identifies golf hole locations 102, 104, 106, 108 and 110 for green 100 into the system. Wherein, the system parses the table to store golf hole locations 102, 104, 106, 108 and 110 in the database along with the identification of green 100. As one of skill in the art will recognize, the manner of storage may vary and remain within the scope and spirit of the invention. Additionally, the term "database" will be used to describe any storage medium, including storage component 202, and any format of storing the information which may be utilized by the system and method of the present invention.

Box 306 illustrates a determination of whether database creation is completed. If the database is still being populated, the system continues to receive inputs of golf hole locations and the identification of associated greens until the database creation is complete. As one skilled in the art will recognize, the database may be repopulated, updated, or otherwise edited at any time.

In box 308, the database is accessed for the golf hole locations and associated greens. For example, processing component 204 accesses storage component 202 for golf hole locations 102, 104, 106, 108 and 110 associated with green 100. In some embodiments, processing component 204 may operate to move an identified portion of information from the database into another memory component (not shown separately) for further processing. For example, processing component may operate to move the information associated with green 100 and not any other green into local random access memory in order to increase processing speed.

In box 310, at least one attribute of each golf hole location is analyzed. With reference to FIG. 2, the analysis of at least one attribute may be conducted by analyzing component 206. In box 312, an available set of golf hole locations is developed based upon an analysis of attributes associated with each golf hole location. For example, an available set of golf hole locations is developed by a determination of whether each golf hole location belongs in an available set or does not belong in the available set. If a golf hole location is determined not to belong in the available set, the golf hole location may be removed from the available set. Alternatively, if a golf hole location is determined to belong in the available set, the golf hole location is left in the available set.

For example, analyzing component 206 may be operating to determine which golf hole locations on green 100 are not on the back third of green 100. Accordingly, each of golf hole locations 102, 104, 106, 108 and 110 is analyzed. Analyzing component 206 may evaluate a location attribute of green 100 and each of golf hole locations 102, 104, 106, 108 and 110, or analyzing component may evaluate an attribute of each of golf hole locations 102, 104, 106, 108 and 110 which defines the third of the green it is located within. Accordingly, analyzing component 206 determines that golf hole locations 102, 108 and 110 are not in the back third of green 100 and are left in the available set, while golf hole locations 104 and 106 are in the back third of green 100 and are removed from the available set. One of skill in the art will recognize that the analysis component 206 may remove golf hole locations to create an available set for further processing instead of removing golf hole locations that do not belong in the available set and remain within the scope and spirit of the present invention.

In box 314, a determination of whether or not the analysis is complete is conducted. If the analysis is not complete, the analysis may continue in box 316, wherein at least one other attribute of each golf hole location still in the available set is analyzed. To continue the above example, analyzing component 206 may analyze the available set of golf hole locations, golf hole locations 102, 108 and 110, to determine which golf hole locations have not been utilized within the last ten days. In this example, each golf hole location would have an associated last use attribute which analysis component 206 would evaluate. Based upon the analysis, analysis component 206 may determine that golf hole locations 102 and 110 have not been used in the last ten days and remain within the available set while golf hole location 108 was used six days ago and is removed from the available set.

Any number of attributes may be associated with each golf hole location, including location characteristics, topographical characteristics, schedule characteristics, seasonal characteristics, weather characteristics, historical use characteristics, green speed characteristics, green condition characteristics, difficulty characteristics and any other characteristics that may be relevant to the management of a green. In addition, some attributes of a golf hole location may be relatively consistent, such as location characteristics and seasonal characteristics, while others may change regularly, such as weather characteristics and historical use characteristics, or suddenly, such as weather characteristics and green condition characteristics. Accordingly, some attributes may be suited to identify when creating the database while others are suited to be regularly updated. Some potential golf hole location attributes may apply throughout a golf course, such as weather characteristics, which is discussed further below. As one skilled in the art will recognize, the consideration, application, and storage of the various attributes for each golf hole location may vary and remain within the scope and spirit of the present invention.

The general categories of attributes identified below may include any number and variety of sub-categories that may be relevant to green management. For example, location characteristics of golf hole location 106 may include the coordinates of golf hole location 106, the placement of golf hole location 106 in the back-right quadrant of green 100, and the distance from the front edge of green 100 to golf hole location 106 and from the nearest side edge of green 100 to golf hole location 106. For another example, historical use characteristics of golf hole location 108 may include the last three dates on which golf hole location 108 was used, the day of the week golf hole location 108 was last used and/or the conditions for the last day golf hole location 108 was used.

Some attributes may be dependant on other attributes in a variety of manners. For example, a topographical characteristic of golf hole location 102 may be that it is on a slope which also may affect a green speed characteristic of golf hole location 102. In addition, a seasonal characteristic and/or weather characteristic may also affect green speed. For another example, a green speed characteristic may affect a golf hole locations difficulty characteristic.

In addition to the variety of attributes, analyzing component 206 and boxes 310 and/or 316 may apply any number of considerations and/or limitations that may assist in the green management, including geographical limitations, topographical limitations, seasonal limitations, weather limitations, golf hole schedule based limitations, user input disabling limitations, green condition limitations, green speed limitations, green slope limitations, limitations based upon golf rules, and difficulty limitations. The considerations and limitations may be applied by analyzing component 206 and boxes 310 and/or 316 to the various attributes associated with each golf hole location.

A greens superintendent may select which limitations are applied in boxes 310 and/or 316 to facilitate a customized management of a green and/or limitations may be implemented based upon other conditions. For example, a greens superintendent may select to limit golf hole locations on green 100 to those having an easy difficulty rating, for instance golf hole locations 106, 108 and 110. In addition, a weather limitation may be applied to limit the available golf hole locations, golf hole locations 106, 108 and 110, based upon wind characteristics.

For another example, a greens superintendent may have scheduled golf hole location 102 for an upcoming event. Analyzing component 206 may review scheduled hole locations within a timeframe and remove scheduled golf hole location 102 from the available set. A user may also disable golf hole location 104, leaving an available set of golf hole locations 106, 108 and 110. In addition, a greens superintendent may apply topographical limitations to minimize the likelihood that a ball will stop in the back left of green 100, for instance the topography of green 100 and the probability of a golfer's shot selection may indicate golf hole locations 108 and 110 may minimize the likelihood that a ball will stop in the back left of green 100. In this example, the three limitations leave an available set of golf hole locations 108 and 110.

For yet another example, analyzing component 206 may apply a geographic limitation based upon proximity to a previously used golf hole location and the last use of the golf hole location. For instance, if golf hole location 102 was used one day prior, golf hole location 104 was used three days prior and golf hole location 106 was used ten days prior, any golf hole location with in three yards of golf hole location 102 may be removed from the available set, any golf hole location with in two yards of golf hole location 104 may be removed from the available set and any golf hole location with in one yard of golf hole location 106 may be removed from the available set.

As one having skill in the art will recognize, any number and/or types of limitations may be analyzed to determine an available set of golf hole locations. In addition, one skilled in the art will recognize that the various categories of limitations may be applied to reach a user's goals. For example, a topographical limitation, a green speed limitation, a green slope limitation, and/or a weather limitation may be applied to manage the likelihood that a ball will end up in a specific area of the green for each golf hole location. For another example, a thermal analysis of a green may be applied to limit available golf hole locations because of temperature effects on green speed and other aspects of play and green management.

Each golf hole location may be associated with a factor associated with a limitation to weight the likelihood of selecting a golf hole location when considering the limitation. For example, each golf hole location may have a factor associated with the date of last use such that an increased factor is associated with golf hole locations which have not been used as recently. Accordingly, if golf hole location 104 was last used thirty days prior, golf hole location 108 was last used twenty-five days prior and golf hole location 106 was last used twenty days prior, golf hole location 104 may have a factor of 1.30, golf hole location 108 may have a factor of 1.25 and golf hole location 106 may have a factor of 1.20. For another example, a greens superintendent may provide a green speed limitation between 10.5 and 11.5 and enter a preference for a green speed of 11. Accordingly, if golf hole location 104 has a green speed characteristic of 11, golf hole location 106 has a green speed characteristic of 11.3 and golf hole location 108 has a green speed characteristic of 10.9, golf hole location 104 may have a factor of 1, golf hole location 106 may have a factor of 0.85 and golf hole location 108 may have a factor of 0.90. One having skill in the art will recognize that factors for each golf hole location and each limitation may be user selected and/or directly or indirectly based upon an attribute or limitation.

Analyzing component 206 may compute a factor associated with each golf hole location based upon all limitations applied. A factor may be computed on an ongoing basis or once an available set is determined. In addition, analyzing component 206 may compute the factor based upon any number of methods. For example, analyzing component 206 may determine an available set of golf hole locations 104, 106 and 108, and based upon factor averaging golf hole location 104 may have a factor of 1.15, golf hole location 106 may have a factor of 1.025 and golf hole location 108 may have a factor of 1.075. For another example, analyzing component 206 may determine factors for each golf hole location in an available set of golf hole locations 104, 106 and 108 based upon a total of each factor wherein golf hole location 104 may have a factor of 2.30, golf hole location 106 may have a factor of 2.05 and golf hole location 108 may have a factor of 2.15.

In box 318, a golf hole location may be generated on a green from the available set. For example, selecting component 208 may utilize a random generator to determine which golf hole location from the available set, golf hole locations 102 and 110, to generate on green 100. In other embodiments, selecting component may allow a user selection from the available set or utilize any other method of generation to determine which golf hole location to generate. In addition, a golf hole location may be selected in part based upon factors associated with each golf hole location. One of skill in the art will recognize that analyzing component 206, selecting component 208, and/or another portion of processing component 204 may account for factors associated with each golf hole location.

In box 320, a user is optionally able to edit which golf hole location is generated. For example, user interface 210 may be a touch screen display, wherein the available set of golf hole locations, golf hole locations 102 and 110, is depicted and the generated golf hole location is indicated. If for instance golf hole location 102 is indicated as the generated golf hole location, the user may touch golf hole location 110 on the screen to edit the golf hole location.

In other embodiments, boxes 318 and 320 may be replaced by manual selection. For example, selecting component 208 would operate in conjunction with user interface 210 to display the available set of golf hole locations, golf hole locations 102 and 110, and allow the user to select the golf hole location. For instance, selecting component 208 would operate to send a signal to user interface 210, in this case a smart phone, wherein the smart phone would display Option A as golf hole location 102 and Option B as golf hole location 110. The user would then press a button associated with Option B to select golf hole location 110. As one skilled in the art will recognize, there are numerous methods and components which may be applied to select the golf hole location by a manual process, an automated process, and/or a combination of manual and automated process aspects.

In some embodiments, box 322 may confirm that all the required limitations are met. If any limitations are not met, box 318 may generate a new golf hole location on a green from the available set. In addition, an error message may be output by user interface 210 indicating the regeneration and/or any limitations that are not met.

In box 324, a presentation of the golf hole location for a green is output. For example, user interface 210 may include a printer that prints out a greens superintendent instruction sheet indicating golf hole location 110 should be cut on green 100 seven yards from front edge 112 and five yards from right edge 114. A greens superintendent instruction sheet may also include other attributes of golf hole location 110, such as distance from left edge 116, and/or attributes of green 100, such as green depth 118. For another example, user interface 210 may include a website that is updated to show golf hole location 110 on green 100. The presentation may be in the form of a golfer hole location sheet (also known as a golfer pinsheet), a greens superintendent instruction output, and/or a green designer layout In addition, some embodiments provide capability for a user to adjust the golf hole location after an output is provided. For example, user interface 210 may be a mobile GPS device that depicts selected golf hole location 110 for green 100. If a greens superintendent observes a reason not to place the cup at the selected golf hole location, user interface may be used to provide a reason selected golf hole location 110 may not be used and generate a golf hole location from the remaining available set of golf hole locations. One skilled in the art will recognize that any additional outputs may reflect the new golf hole location.

In some embodiments user interface 210 may include a portable device associated with a GPS device. The portable GPS device may be used to map GPS coordinates for all potential golf hole locations on a green to build a database. The GPS coordinates of potential golf hole locations may be provided to system 200 in a downloadable format. In some embodiments system 200 is a portable device associated with a GPS device, such that a greens superintendent may operate the system to select a golf hole location at the green.

In some embodiments system 200 may update attributes associated with a golf hole location based upon any input to and/or determination by system 200. For example, system 200 may update a last use date associated with selected golf hole location 110 to correspond with the date golf hole location 110 is selected for use. For another example, if golf hole location 102 is disabled for a period of time, system 200 may enable golf hole location 102 once the period of time has elapsed.

In addition, some embodiments of process 300 may require and/or provide capability for a user to confirm the cup placement at a selected golf hole location to ensure the accuracy of information regarding the use of each golf hole location. For example, user interface 210 may be a mobile GPS device that depicts selected golf hole location 110 for green 100, and may prompt a greens superintendent to mark the cup placement location so that system 200 can confirm that the cup placement location corresponds to selected golf hole location 110. System 200 may require confirmation prior to providing instructions to cut the next green. In addition, if the cup placement location does not correspond to selected golf hole location 110, system 200 may prompt a user to provide a reason selected golf hole location 110 was not used and update any additional outputs to reflect the cup placement location.

As one skilled in the art will recognize, system 200 and process 300 may be applied to a plurality of greens. For example, process 300 may be utilized to manage an eighteen-hole golf course. Various boxes of the embodiment in process 300 may be applied serially, in parallel, or a combination thereof to reach an output of a golf hole location for each of the eighteen greens of the exemplary golf course.

For example, boxes 302, 304 and 306 relating to creating and building of the database, may be conducted by entering in bulk golf hole locations and other associated attributes for a green in the green order (i.e. first green, second green, . . . ). Alternatively, each entry may identify the associated green such that a golf hole location for the eleventh green may be entered followed by a golf hole location for the second green, until the golf hole locations are entered. For another example, storage component 202 may be accessed one green at a time or once for the plurality of greens.

Boxes 310 and 316 may analyze attributes of golf hole locations based upon limitations for one green and/or course limitations applicable to a plurality of greens. For example, analyzing component 206 may apply user input disabling limitations to develop an available set of golf hole locations. In addition, a greens superintendent may select to have a medium course difficulty, and system 200 may generate a golf hole location for each green of a plurality of greens whereby the average of all golf hole locations is a medium difficulty. One of skill in the art will recognize that course limitations may include hole relationship limitations, topographical limitations, seasonal limitations, weather limitations, schedule limitations, user input disabling limitations, course green speed limitations, course green slope limitations, course distance limitations, course par limitations, and/or course difficulty limitations.

As another example, a greens superintendent for an eighteen-hole course may desire to have five golf greens with a green speed of 11, five golf greens with a green speed of 10 and eight golf greens with a green speed of 10.5. A greens keeper may also provide for a course distance limitation to ensure that the selected golf hole locations cause the total yardage for the course to be within three yards of the designed yardage for the course. In addition, a greens superintendent may provide hole relationship limitations for geographical variation among greens, such that each selected golf hole location for each green is not in the same general location on the green. For instance, the selected golf hole location for each green is not in the back-right portion of each green. Finally, a greens superintendent may desire to limit the average slope of golf hole locations on the course. System 200 may apply each of the greens superintendent's desired limitations to select golf hole locations for each green on the eighteen-hole course.

Course limitations may be applied in a number of manners. For example, analyzing component 206 may apply each limitation to determine which combinations of golf hole locations will meet the course limitations and selecting component 208 may generate a golf hole location for each green which corresponds with one of the determined combinations. For another example, analyzing component 206 may determine an available set for a first green and selecting component 208 may select a golf hole location for a first green, then analyzing component 206 may apply a factor based upon the golf hole location selected for a first green and determine an available set for a second green and selecting component 208 may select a golf hole location for a second green, etc. For yet another example, once analyzing component 206 applies each limitation to determine an available set of golf hole locations for each green and selecting component 208 generates a golf hole location for each green from each available set, processing component 204 may confirm whether the selected golf hole locations meet the course limitations. If the selected golf hole locations do not meet the course limitations, selecting component 208 may regenerate a golf hole location for each green from each available set and processing component 204 may repeat the confirmation process.

Golf hole locations may be associated with an attribute which is conditioned upon a course condition. For example, each golf hole location may be associated with an attribute which is conditioned upon a course condition, such as wind characteristics. Although wind speed may affect the course, it may have a different effect on each golf hole due to surroundings and wind direction. Accordingly, some golf hole locations may be affected while others may not be affected.

The invention being thus described, it will be obvious that the same may be varied in many ways. Such variations are not to be regarded as a departure from the spirit and scope of the invention and all such modifications as would be obvious to one skilled in the art are intended to be included within the scope of the system, method, or computer program product described.

What is claimed:

1. A system for management of a physical golf green through selection of a location for a physical golf hole on said green, the system comprising:
 a processor;
 a memory; and
 a determination component stored in the memory, wherein said determination component is executed by said processor to:
 a) access a database, wherein said database comprises a plurality of potential locations for said physical golf hole on said green;
 b) determine an available set of potential locations for said physical golf hole on said green, wherein said available set of potential locations for said physical golf hole on said green is determined by analyzing an attribute associated with each of said potential locations for said physical golf hole on said green and removing a subset of potential locations for said physical golf hole on said green from said plurality of potential locations for said physical golf hole on said green based upon said analysis, wherein said analyzing said attribute associated with each of said potential locations for said physical golf hole on said green further comprises: identifying a limitation based upon said attribute, and determining for each of said plurality of said potential locations for said physical golf hole on said green if said attribute associated with each of said potential locations for said physical golf hole on said green is included within said limitation;

c) select said location for said physical golf hole on said green from said available set of potential locations for said physical golf hole on said green; and d) output a presentation of said location for said physical golf hole on said green.

2. The system of claim 1, wherein said determination component is further executed by said processor to input said plurality of said potential locations for said physical golf hole on said green into said database.

3. The system of claim 1, wherein said subset of potential locations for said physical golf hole on said green comprises said potential locations for said physical golf hole on said green included within said limitation.

4. The system of claim 1, wherein said limitation comprises at least one of a geographical limitation, a topographical limitation, a seasonal limitation, a weather limitation, a thermal limitation, a limitation based on a schedule for said potential location for said physical golf hole on said green, a user input disabling limitation, a green condition limitation, a green speed limitation, a green slope limitation, a limitation based upon a golf rule, and a difficulty limitation.

5. The system of claim 1, wherein said attribute associated with each of said potential locations for said physical golf hole on said green comprises at least one of a location characteristic, a topographical characteristic, a schedule characteristic, a seasonal characteristic, a weather characteristic, a thermal characteristic, a historical use of said potential location for said physical golf hole on said green characteristic, a green speed characteristic, a green condition characteristic, and a difficulty characteristic.

6. The system of claim 1, wherein said determination component is further executed by said processor to generate said location for said physical golf hole on said green from said available set of potential locations for said physical golf hole on said green.

7. The system of claim 6, wherein said determination component is further executed by said processor to edit said location for said physical golf hole on said green based upon said available set of potential locations for said physical golf hole on said green.

8. The system of claim 1, wherein said presentation is output in at least one of an electronic format, an audio format, a written format, and a printed format.

9. The system of claim 1, wherein said presentation is at least one of a golfer pinsheet, a greens superintendent instruction output, and a green designer layout.

10. The system of claim 1, wherein said green further comprises a plurality of greens, wherein each specific green of said plurality of greens is associated with said plurality of potential locations for said physical golf hole on said specific green.

11. The system of claim 10, wherein said determination component is further executed by said processor to:

determine said available set of potential locations for said physical golf hole on said green for each green of said plurality of greens;

select said location for said physical golf hole on each green of said plurality of greens from said available set of potential locations for said physical golf hole on said green for each green of said plurality of greens; and output said presentation of said location for said physical golf hole on each green of said plurality of greens.

12. The system of claim 11, wherein said identifying said limitation based upon said attribute comprises identifying a green limitation based upon said attribute; and wherein said determining for each of said plurality of said potential locations for said physical golf hole on said green if said attribute associated with each of said potential locations for said physical golf hole on said green is included within said limitation comprises determining for each of said plurality of said potential locations for said physical golf hole on said green for each green of said plurality of greens if said attribute associated with each of said potential locations for said physical golf hole on said green is included within said green limitation.

13. The system of claim 12, wherein said green limitation comprises at least one of a geographical limitation, a topographical limitation, a seasonal limitation, a weather limitation, a thermal limitation, a limitation based on a schedule for said potential location for said physical golf hole on said green, a user input disabling limitation, a green condition limitation, a green speed limitation, a green slope limitation, a limitation based upon a golf rule, and a difficulty limitation.

14. The system of claim 11, wherein said identifying said limitation based upon said attribute comprises identifying a course limitation based upon said attribute; and wherein said determining for each of said plurality of said potential locations for said physical golf hole on said green if said attribute associated with each of said potential locations for said physical golf hole on said green is included within said limitation comprises determining for each of said plurality of said potential locations for said physical golf hole on said green for each green of said plurality of greens if said attribute associated with each of said potential locations for said physical golf hole on said green is included within said course limitation.

15. The system of claim 14, wherein said course limitation comprises at least one of a hole relationship limitation, a topographical limitation, a seasonal limitation, a weather limitation, a limitation based on a schedule for said potential location for said physical golf hole on said green, a user input disabling limitation, a course green speed limitation, a course green slope limitation, a limitation based upon a golf rule, a course distance limitation, a course par limitation, and a course difficulty limitation.

16. The system of claim 1, further comprising a GPS device.

17. A method for management of a physical golf green through selection of a location for said physical golf hole on said green, the method comprising:

accessing a database, wherein said database comprises a plurality of potential locations for said physical golf hole on said green;

determining an available set of potential locations for said physical golf hole on said green, wherein said available set of potential locations for said physical golf hole on said green is determined by analyzing an attribute associated with each of said potential locations for said physical golf hole on said green and removing a subset of potential locations for said physical golf hole on said green from said plurality of potential locations for said physical golf hole on said green based upon said analysis;

selecting said location for said physical golf hole on said green from said available set of potential locations for said physical golf hole on said green; and outputting a presentation of said location for said physical golf hole on said green,
wherein said green further comprises a plurality of greens, wherein each specific green of said plurality of greens is associated with said plurality of potential locations for said physical golf hole on said specific green, and said method further comprising:
determining said available set of potential locations for said physical golf hole on said green for each green of said plurality of greens;
selecting said location for said physical golf hole on each green of said plurality of greens from said available set of potential locations for said physical golf hole on said green for each green of said plurality of greens; and
outputting said presentation of said location for said physical golf hole on each green of said plurality of greens.

18. The method of claim 17, further comprising inputting said plurality of said potential locations for said physical golf hole on said green into said database.

19. The method of claim 17, wherein said analyzing said attribute associated with each of said potential locations for said physical golf hole on said green further comprises:
identifying a limitation based upon said attribute; and
determining for each of said plurality of said potential locations for said physical golf hole on said green if said attribute associated with each of said potential locations for said physical golf hole on said green is included within said limitation.

20. The method of claim 19, wherein said subset of potential locations for said physical golf hole on said green comprises said potential locations for said physical golf hole on said green included within said limitation.

21. The method of claim 19, wherein said limitation comprises at least one of a geographical limitation, a topographical limitation, a seasonal limitation, a weather limitation, a thermal limitation, a limitation based on a schedule for said potential location for said physical golf hole on said green, a user input disabling limitation, a green condition limitation, a green speed limitation, a green slope limitation, a limitation based upon a golf rule, and a difficulty limitation.

22. The method of claim 17, wherein said attribute associated with each of said locations for said physical golf hole comprises at least one of a location characteristic, a topographical characteristic, a schedule characteristic, a seasonal characteristic, a weather characteristic, a thermal characteristic, a historical use of said potential location for said physical golf hole on said green characteristic, a green speed characteristic, a green condition characteristic, and a difficulty characteristic.

23. The method of claim 17, further comprising generating said location for said physical golf hole on said green from said available set of potential locations for said physical golf hole on said green.

24. The method of claim 23, further comprising editing said location for said physical golf hole on said green based upon said available set of potential locations for said physical golf hole on said green.

25. The method of claim 17, wherein said presentation is output in at least one of an electronic format, an audio format, a written format, and a printed format.

26. The method of claim 17, wherein said presentation is at least one of a golfer pinsheet, a greens superintendent instruction output, and a green designer layout.

27. The method of claim 17, wherein said analyzing said attribute associated with each of said potential locations for said physical golf hole on said green further comprises:
identifying a green limitation based upon said attribute; and
determining for each of said plurality of said potential locations for said physical golf hole on said green for each green of said plurality of greens if said attribute associated with each of said potential locations for said physical golf hole on said green is included within said green limitation.

28. The method of claim 27, wherein said green limitation comprises at least one of a geographical limitation, a topographical limitation, a seasonal limitation, a weather limitation, thermal limitation, a limitation based on a schedule for said potential location for said physical golf hole on said green, a user input disabling limitation, a green condition limitation, a green speed limitation, a green slope limitation, a limitation based upon a golf rule, and a difficulty limitation.

29. The method of claim 17, wherein said analyzing said attribute associated with each of said potential locations for said physical golf hole on said green further comprises:
identifying a course limitation based upon said attribute; and
determining for each of said plurality of said potential locations for said physical golf hole on said green for each green of said plurality of greens if said attribute associated with each of said potential locations for said physical golf hole on said green is included within said course limitation.

30. The method of claim 29, wherein said course limitation comprises at least one of a hole relationship limitation, a topographical limitation, a seasonal limitation, a weather limitation, a limitation based on a schedule for said potential location for said physical golf hole on said green, a user input disabling limitation, a course green speed limitation, a course green slope limitation, a course distance limitation, a course par limitation, and a course difficulty limitation.

31. A tangible non-transitory computer readable storage medium storing computer executable program code that, when executed by a processor, causes said computer executable program code to perform a method for management of a physical golf green comprising:
accessing a database, wherein said database comprises a plurality of potential locations for said physical golf hole on said green;
determining an available set of potential locations for said physical golf hole on said green, wherein said available set of potential locations for said physical golf hole on said green is determined by analyzing an attribute associated with each of said potential locations for said physical golf hole on said green and removing a subset of potential locations for said physical golf hole on said green from said plurality of potential locations for said physical golf hole on said green based upon said analysis, wherein said analyzing said attribute associated with each of said potential locations for said physical golf hole on said green further comprises:
identifying a limitation based upon said attribute; and
determining for each of said plurality of said potential locations for said physical golf hole on said green if said attribute associated with each of said potential locations for said physical golf hole on said green is included within said limitation;

selecting said location for said physical golf hole on said green from said available set of potential locations for said physical golf hole on said green; and outputting a presentation of said location for said physical golf hole on said green.

32. The tangible non-transitory computer readable storage medium of claim 31, further comprising inputting said plurality of said potential locations for said physical golf hole on said green into said database.

33. The tangible non-transitory computer readable storage medium of claim 31, wherein said limitation comprises at least one of a geographical limitation, a topographical limitation, a seasonal limitation, a weather limitation, a thermal limitation, a limitation based on a schedule for said potential location for said physical golf hole on said green, a user input disabling limitation, a green condition limitation, a green speed limitation, a green slope limitation, a limitation based upon a golf rule, and a difficulty limitation.

34. The tangible non-transitory computer readable storage medium of claim 31, wherein said attribute associated with each of said potential locations for said physical golf hole on said green comprises at least one of a location characteristic, a topographical characteristic, a schedule characteristic, a seasonal characteristic, a weather characteristic, a thermal characteristic, a historical use of said potential location for said physical golf hole on said green characteristic, a green speed characteristic, a green condition characteristic, and a difficulty characteristic.

35. The tangible non-transitory computer readable storage medium of claim 31, further comprising generating said golf hole location on said green from said available set of potential locations for said physical golf hole on said green.

36. The tangible non-transitory computer readable storage medium of claim 35, further comprising editing said location for said physical golf hole on said green based upon said available set of potential locations for said physical golf hole on said green.

37. The tangible non-transitory computer readable storage medium of claim 31, wherein said presentation is output in at least one of an electronic format, an audio format, a written format, and a printed format.

38. The tangible non-transitory computer readable storage medium of claim 31, wherein said green further comprises a plurality of greens, wherein each green of said plurality of greens is associated with said plurality of potential locations for said physical golf hole on said green.

39. The tangible non-transitory computer readable storage medium of claim 38, further comprising:

determining said available set of potential locations for said physical golf hole on said green for each green of said plurality of greens;

selecting said location for said physical golf hole on each green of said plurality of greens from said available set of potential locations for said physical golf hole on said green for each green of said plurality of greens; and outputting said presentation of said location for said physical golf hole on each green of said plurality of greens.

40. The tangible non-transitory computer readable storage medium of claim 39, wherein said identifying said limitation based upon said attribute comprises identifying a green limitation based upon said attribute; and wherein determining for each of said plurality of said potential locations for said physical golf hole on said green if said attribute associated with each of said potential locations for said physical golf hole on said green is included within said limitation comprises determining for each of said plurality of said potential locations for said physical golf hole on said green for each green of said plurality of greens if said attribute associated with each of said potential locations for said physical golf hole on said green is included within said green limitation.

41. The tangible non-transitory computer readable storage medium of claim 38, wherein said identifying said limitation based upon said attribute comprises identifying a course limitation based upon said attribute; and wherein determining for each of said plurality of said potential locations for said physical golf hole on said green if said attribute associated with each of said potential locations for said physical golf hole on said green is included within said limitation comprises determining for each of said plurality of said potential locations for said physical golf hole on said green for each green of said plurality of greens if said attribute associated with each of said potential locations for said physical golf hole on said green is included within said course limitation.

42. The tangible non-transitory computer readable storage medium of claim 41, wherein said course limitation comprises at least one of a hole relationship limitation, a topographical limitation, a seasonal limitation, a weather limitation, a limitation based on a schedule for said potential location for said physical golf hole on said green, a user input disabling limitation, a course green speed limitation, a course green slope limitation, a course distance limitation, a course par limitation, and a course difficulty limitation.

* * * * *

UNITED STATES PATENT AND TRADEMARK OFFICE
CERTIFICATE OF CORRECTION

PATENT NO.         : 9,952,327 B2
APPLICATION NO.    : 12/760817
DATED              : April 24, 2018
INVENTOR(S)        : Jonathan Dwight Schultz It is certified that error appears in the above-identified patent and that said Letters Patent is hereby corrected as shown below:

In the Specification

Column 1, Line 60: delete "a evenly" and insert --an evenly--

Column 3, Line 66: delete "of" between "aspects" and "shown"

Column 4, Lines 6-7: delete ", in box 304,"

Column 4, Line 23: insert --of-- between "number" and "methods"

Column 6, Line 12: delete "locations" and insert --location's--

Column 8, Line 38: insert --.-- after "layout"

Column 9, Line 24: delete ", 304"

In the Claims

Column 10, Line 60, Claim 1: insert --said-- between "of" and "potential"

Column 11, Line 55, Claim 10: insert --said-- before "potential"

Column 11, Line 60, Claim 11: delete "for each green" and insert --for said each specific green--

Column 11, Lines 62-63, Claim 11: delete "on each green" and insert --on said each specific green--

Column 11, Line 65, Claim 11: delete "for each green" and insert --for said each specific green--

Column 11, Line 67, Claim 11: delete "on each green" and insert --on said each specific green--

Signed and Sealed this
Third Day of July, 2018

Andrei Iancu
*Director of the United States Patent and Trademark Office*

CERTIFICATE OF CORRECTION (continued)
U.S. Pat. No. 9,952,327 B2

Column 12, Line 11, Claim 12: delete "each green" and insert --said each specific green--

Column 12, Line 34, Claim 14: delete "each green" and insert --said each specific green--

Column 12, Line 62, Claim 17: insert --said-- between "of" and "potential"

Column 13, Line 5, Claim 17: insert --said-- between "of" and "potential"

Column 13, Line 9, Claim 17: delete "for each green" and insert --for said each specific green--

Column 13, Line 14, Claim 17: delete "for each green" and insert --for said each specific green--

Column 13, Line 16, Claim 17: delete "on each green" and insert --on said each specific green--

Column 13, Line 46, Claim 22: insert --potential-- between "said" and "locations"

Column 14, Line 8, Claim 27: delete "each green" and insert --said each specific green--

Column 14, Line 29, Claim 29: delete "each green" and insert --said each specific green--

Column 14, Line 57, Claim 31: insert --said-- between "of" and "potential"

Column 15, Line 1, Claim 31: delete "selecting said" and insert --selecting a--

Column 15, Lines 31-32, Claim 35: delete "golf hole location on said green" and insert --location for said physical golf hole on said green--

Column 15, Line 46, Claim 38: insert --said-- between "of" and "potential"

Column 15, Line 47, Claim 38: insert --each-- before "green"

Column 16, Line 2, Claim 39: insert --said-- between "for" and "each"

Column 16, Line 4, Claim 39: insert --said-- between "on" and "each"

Column 16, Line 7, Claim 39: insert --said-- between "for" and "each"

Column 16, Line 9, Claim 39: insert --said-- between "on" and "each"

Column 16, Line 21, Claim 40: insert --said-- before "each green"

Column 16, Line 36, Claim 41: insert --said-- before "each green"